(12) United States Patent
Medas et al.

(10) Patent No.: US 11,475,323 B2
(45) Date of Patent: Oct. 18, 2022

(54) SYSTEMS AND METHODS FOR CROWDSOURCING DEVICE RECOGNITION

(71) Applicant: Fing Limited, Dublin (IE)

(72) Inventors: Carlo Medas, Rome (IT); Marco De Angelis, Rome (IT)

(73) Assignee: Fing Limited, Dublin (IE)

( * ) Notice: Subject to any disclaimer, the term of this patent is extended or adjusted under 35 U.S.C. 154(b) by 132 days.

(21) Appl. No.: 16/650,994

(22) PCT Filed: Sep. 27, 2018

(86) PCT No.: PCT/IB2018/057522
§ 371 (c)(1),
(2) Date: Mar. 26, 2020

(87) PCT Pub. No.: WO2019/064237
PCT Pub. Date: Apr. 4, 2019

(65) Prior Publication Data
US 2020/0242488 A1 Jul. 30, 2020

Related U.S. Application Data

(60) Provisional application No. 62/564,737, filed on Sep. 28, 2017.

(51) Int. Cl.
*G06N 5/04* (2006.01)
*G06N 20/20* (2019.01)
(Continued)

(52) U.S. Cl.
CPC ............... *G06N 5/04* (2013.01); *G06N 5/003* (2013.01); *G06N 20/20* (2019.01); *H04L 61/50* (2022.05);
(Continued)

(58) Field of Classification Search
CPC .......... G06N 5/04; G06N 5/003; G06N 20/20; H04L 61/20; H04L 61/6022; H04L 67/303
(Continued)

(56) References Cited

U.S. PATENT DOCUMENTS 6,658,585 B1 * 12/2003 Levi ..................... H04L 43/00
714/4.3
2014/0201212 A1 * 7/2014 Qi ......................... H04L 67/125
707/741
(Continued)

FOREIGN PATENT DOCUMENTS

| EP | 32234875 | 9/2017 |
|---|---|---|
| WO | 2018/004580 A1 | 1/2018 |

OTHER PUBLICATIONS

Office Action issued in related CA 3,076,319 dated May 12, 2021.
(Continued)

*Primary Examiner* — James E Springer
(74) *Attorney, Agent, or Firm* — Hogan Lovells US LLP

(57) ABSTRACT

Embodiments of the present invention provide techniques, systems, and methods for crowdsourcing device recognition to collect device information and identification data from a limited number of network devices and then leverage the collected information with machine learning techniques to
(Continued)

expand the starting set in way that the prediction of device attributes like device type, device brand, family and model can be applied on billions of devices.

19 Claims, 6 Drawing Sheets

(51) Int. Cl.
    *G06N 5/00*       (2006.01)
    *H04L 67/303*    (2022.01)
    *H04L 61/50*     (2022.01)
    *H04L 101/622*   (2022.01)

(52) U.S. Cl.
    CPC ...... *H04L 67/303* (2013.01); *H04L 2101/622* (2022.05)

(58) Field of Classification Search
    USPC .......................................................... 706/12
    See application file for complete search history.

(56) References Cited

U.S. PATENT DOCUMENTS

| | | | | |
|---|---|---|---|---|
| 2018/0048534 A1* | 2/2018 | Banga | ..................... | H04L 41/14 |
| 2019/0213446 A1* | 7/2019 | Tsou | ....................... | H04W 4/70 |
| 2020/0057662 A1* | 2/2020 | Zhou | ......................... | G06F 8/38 |

OTHER PUBLICATIONS

Miettinen Markus et al. "IoT Sentinel Demo: Automated Device Type Identification for Security Enforcement in IoT" Proceedings of the International Conference on Distributed Computing Systems, IEEE Computer Seciety, Jun. 5, 2017, pp. 2511-2514.

Yair Median et al. Detection of Unauthorized IoT Devices Using Machine Learning Techniques; https://arxiv.org/pdf/1709.04647.pdf Sep. 14, 2017.

International Search Report and Written Opinion issued in PCT Application Serial No. PCT/UB2018/057522 dated Jan. 17, 2019.

Office Action issued in related CA Application No. 3,076,319 dated Jan. 17, 2022.

Office Action issued in related EP Application No. 18788907.6 dated Jan. 26, 2022.

* cited by examiner

SYSTEMS AND METHODS FOR CROWDSOURCING DEVICE RECOGNITION

CROSS REFERENCE TO RELATED APPLICATIONS

This application claims priority to PCT Application Serial No. PCT/IB2018/057522 filed Sep. 27, 2018 which claims the benefit of U.S. Provisional Patent Application No. 62/564,737 filed Sep. 28, 2017, which are all hereby incorporated by reference herein in its entirety.

BACKGROUND

As networked devices become more pervasive throughout enterprises, it is increasingly difficult to manage and identify all the devices on a network. For example, not only are telecommunication devices logged onto networks, but other consumer electronic devices are enabled with network connectivity, including personal items (e.g., pedometers, watches), medical devices, household appliances, and vehicles. Further, it is increasingly difficult to determine the presence of devices on the network, and therefore control the storage of sensitive data on all the devices within the network. Moreover, valuable information can be determined from sparse device information gathered from merely detecting devices on the network, which can be used in various applications in the Internet-of-Things (IoT), consumer retail, insurance, device theft and fraud, etc. Accordingly, there is a need for systems and methods of recognizing devices within a network in order to monitor, manage, and secure the devices within the network.

BRIEF DESCRIPTION OF THE DRAWINGS

Various embodiments in accordance with the present disclosure will be described with reference to the drawings, in which.

DETAILED DESCRIPTION

Figure 1:
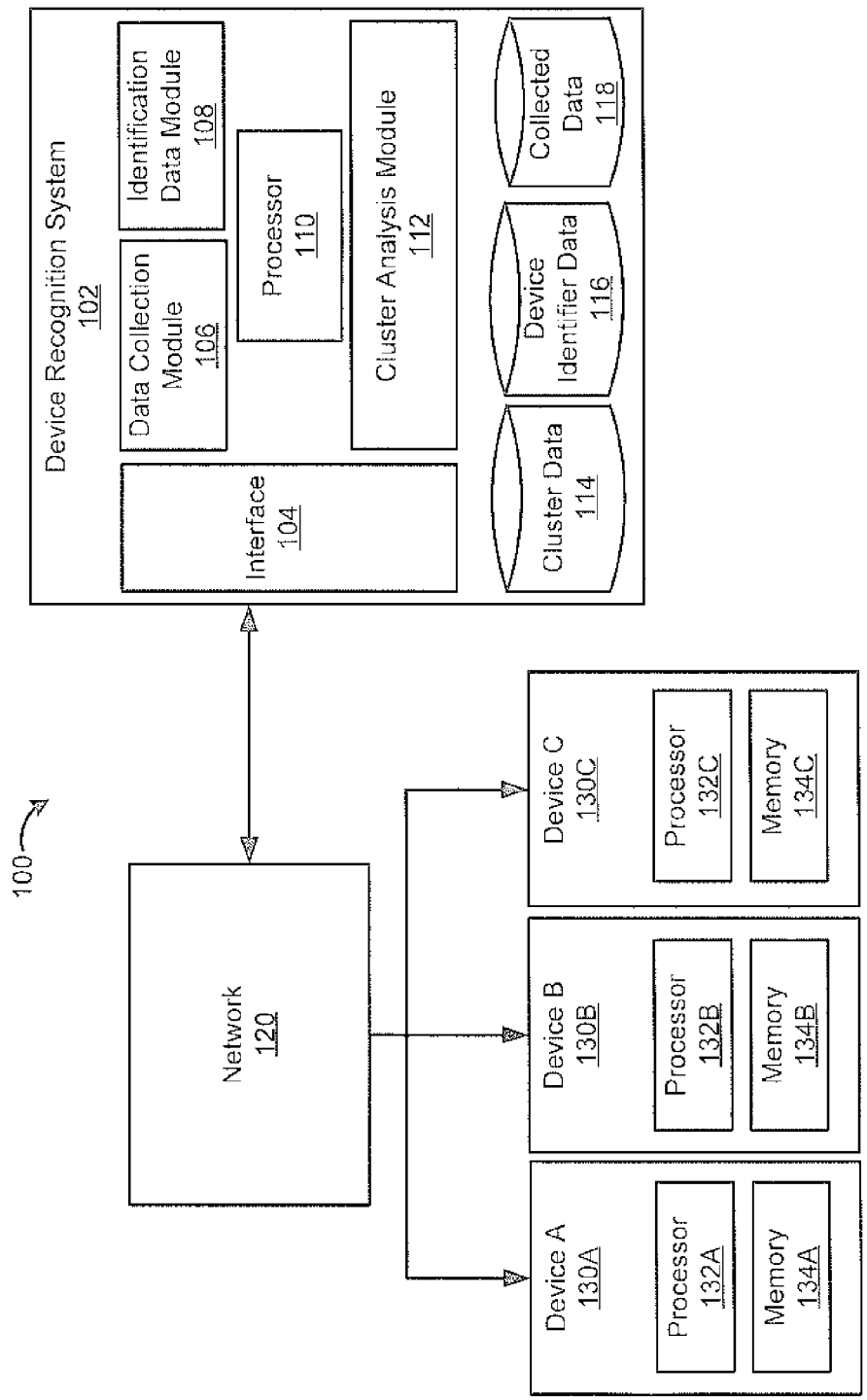
FIG. 1 illustrates a block diagram of an example system for collecting device information on a network to predict other devices on the network, in accordance with embodiments of the present invention.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention provide techniques, including systems and methods, for collecting device information to identify and recognize devices on a network. According to various embodiments, a device recognition system may collect device data (e.g., identifying information) from a subset of devices on a network and use machine learning techniques to perform a predictive clustering analysis of other devices on the network. In some embodiments, collecting device information on a network may be performed by crowdsourcing the device information for the device recognition system to iteratively learn, recognize, and predict existing and new devices on the network. As such, embodiments of the present application provide improved methods and techniques of collecting device information and identification data from a limited number of network devices to then leverage the collected information with machine learning techniques in order to predict device attributes of the existing device, such as device type, device brand, family, etc. In some embodiments, a predictive model may be generated such that the predictive model can use the information collected from a limited number of devices on a network to predict the other devices on the network.

Device detection, according to various embodiments, includes various techniques for identifying devices accessing online content on a network. Detecting and identifying devices within a network or within a geographic range provides many advantages and benefits. Embodiments of the present invention include improved techniques for providing content that is accessible to users across a plurality of devices, types of devices, operating systems, browsers, etc. Device detection, according to various embodiments of the present application, serves to resolve technical problems users encounter when attempting to access online content using different devices (e.g., viewing a website from a laptop compared to viewing the website from a mobile phone). Depending on the type of device used to access the content, the format or layout of the content may not be suitable for the particular device, or the website may not be compatible with the browser or the device, for example.

Embodiments of the present invention also include improved techniques of providing targeted content to users. For example, data about what devices users are using to access the online content of a business can be valuable to the business in determining how to market and/or advertise their products, how to improve their products, and how to provide services to their users. Identifying the devices used to access various types of data can be used to extrapolate and reveal other characteristics of the users themselves, such as demographic data. The user data extrapolated from the device identifying data can be further used to predict other types of content particular groups of users may be interested in. For example, the type of device identified may be correlated with users of a particular socio-economic group and therefore advertising and search results may be adjusted based on what is statistically more likely to be relevant to that particular socio-economic group. These user predictions can be used by various machine learning algorithms to determine relevant and targeted content for specific users, based on the identification data of the specific users' devices.

Embodiments of the present invention also include improved techniques of device detection and identification of devices on a network. Device identification data of specific users on a network may be cross referenced with a device database. Depending on the device database, device detection can be used to determine specifications of the visiting devices for various applications for various product and service providers, as well as their users. As such, the theft of a user's device can also be easily located and identified when it is detected on another network in another location. In other embodiments, the device identification data may be used to identify users to notify when there is a product recall, determine the proper insurance for that particular device, and/or provide other relevant device services to users for the identified devices.

Existing techniques of device detection have several problems which embodiments of the present invention resolve. For example, existing techniques use the Hypertext Transfer Protocol (HTTP) standard, which defines user-agent strings as the default way to provide information about a device sending a request to a web server on a network. However, the HTTP standard does not define how user-agent strings are created, resulting in inconsistent keywords in user-agent strings across browsers and devices. The inconsistent user-agent strings can be used to mask real identifying information about the device, as such, using standard HTTP protocol does not always result in accurate identification of the devices. Embodiments of the present invention resolve the technical problem of inaccurate device identification by using a unique, assigned identifier (e.g., MAC address) instead of the HTTP standard user-agent strings. Accordingly, device identification information can be obtained more quickly and accurately, resulting in better data for prediction analysis and other applications for the users based on the device data.

As examples, one or more embodiments of the present invention may include: A method for device recognition, the method comprising collecting device data associated with a device detected on a network; identifying the device based at least in part on the device data to create an identification; and predicting, using machine learning ensembles, a set of device characteristics based at least in part on the identification, wherein the machine learning ensembles classify the device into a predicted group of devices having the set of device characteristics. The step of predicting may include the steps of determining a portion of a hardware address corresponding to the device, and utilizing the portion of the hardware address in the machine learning ensembles to determine the set of device characteristics. A length of the portion of the hardware address may be proportional to a size of the predicted group of devices having the set of device characteristic. The method may further comprise generating a confidence score as a function of the portion of the hardware address and of the size of the predicted group of devices. The set of device characteristics may include at least one of a device brand identifier and a device model identifier. The set of device characteristics may include a manufacturing batch identifier. The machine learning ensembles utilize multiple decision trees to classify the device. The method may further comprise the step of providing targeted content to the device based on the set of device characteristics, wherein the device characteristics include a brand of the device and a model of the device.

As further examples, one or more embodiments of the present invention may include: A system comprising a processor; and a non-transitory computer-readable medium storing instructions executable by the processor to: collect a plurality of device data associated with a set of devices detected on a network; determine a key based on an analysis of a portion of the plurality of device data; identify, based at least in part on the key, device specifications corresponding to the set of devices; determine a cluster of devices among the set of devices based at least in part on the device specifications; and output the cluster of devices and the key as entries in a data structure, wherein the key is used as an index to the data structure to determine the cluster of devices. The plurality of device data may include a media access control (MAC) address of each device in the set of devices. The key may be a portion of a MAC address of a device in the set of devices. The length of the key may be proportional to a size of the cluster of devices. The cluster of devices may be determined based on a removal of a redundant cluster of devices of insufficient cluster size. The removal of a redundant cluster of devices of insufficient cluster size may be based on a predetermined threshold. The device specifications may be identified by utilizing the key in machine learning ensembles.

As yet further examples, one or more embodiments of the present invention may include: A device recognition system comprising a data collection module configured to collect device data associated with a device on a network; an identification data module configured to identify the device based at least in part on the device data to create an identification; and a cluster analysis module configured to predict, using machine learning ensembles, a set of device characteristics based at least in part on the identification, wherein the machine learning ensembles classify the device into a predicted group of devices having the set of device characteristics. The cluster analysis module may be further configured to determine a portion of a hardware address corresponding to the device, and utilize the portion of the hardware address in the machine learning ensembles to determine the set of device characteristics. The set of device characteristics may include at least one of a device brand identifier and a device model identifier. The set of device characteristics may include a manufacturing batch identifier. The machine learning ensembles may utilize multiple decision trees to classify the device.

FIG. 1 illustrates an example system 100 for collecting device information on a network to predict other devices on the network, in accordance with embodiments of the present invention. The system 100 may include a device recognition system 102 that is connected to a network 120, such as the Internet. The network 10 can be any network to which devices, systems, servers, computers, etc. can connect to in order to communicate with each other. Multiple devices, such as Device A 130A, Device B 130B, and Device C 130C, may be connected to the Internet 104. Each device 130A, 130B, and 130C may have a corresponding processor 132A, 132B, 132C and a memory 134A, 134B, 134C, on which each corresponding device's identification information may be stored.

According to various embodiments of the invention, the device recognition system 102 may interface with the network 120 through an interface 104. The device recognition system 102 may include a processor 110 and a memory with executable instructions that perform specific functions. For example, the device recognition system may include a data collection module 106 that is configured with executable code to first conduct a Data Collection Phase. In the Data Collection Phase, the data collection module 106 of the device recognition system 102 may scan the network 120 to gather data from a limited number of devices on the network 120. The device recognition system 102 may then include an identification data module 108 that extrapolates device identification information from the raw data that is collected from the data collection module 106. For example, device identifying information, such as a media access control (MAC) address, may be extrapolated by the identification data module 108. All collected raw data may be stored in a collected data database 118, and device identifier data (e.g., MAC address) may be stored in a device identifier data database 116.

According to various embodiments of the invention, the device recognition system 102 may then perform a Supervised Learning and MAC Clustering Analysis on the device information. This may be performed by a Cluster Analysis Module 112 that can access the device identifier data database 116 and collected data 118, to determine specific clusters of device identifiers, which can then be stored in cluster data 114. In some embodiments, the device recognition system 102, or another third party entity, may also have a user information database, which may be cross-referenced with the device identifier data database 116, cluster data 114, or raw collected data 118, to perform various statistical analytics on user demographics to determine user correlations with device information. The analytics may be used to create predictive models on user behavior, device identification on various networks, relevant content to the users, targeted device services to the users, etc.

Figure 2:
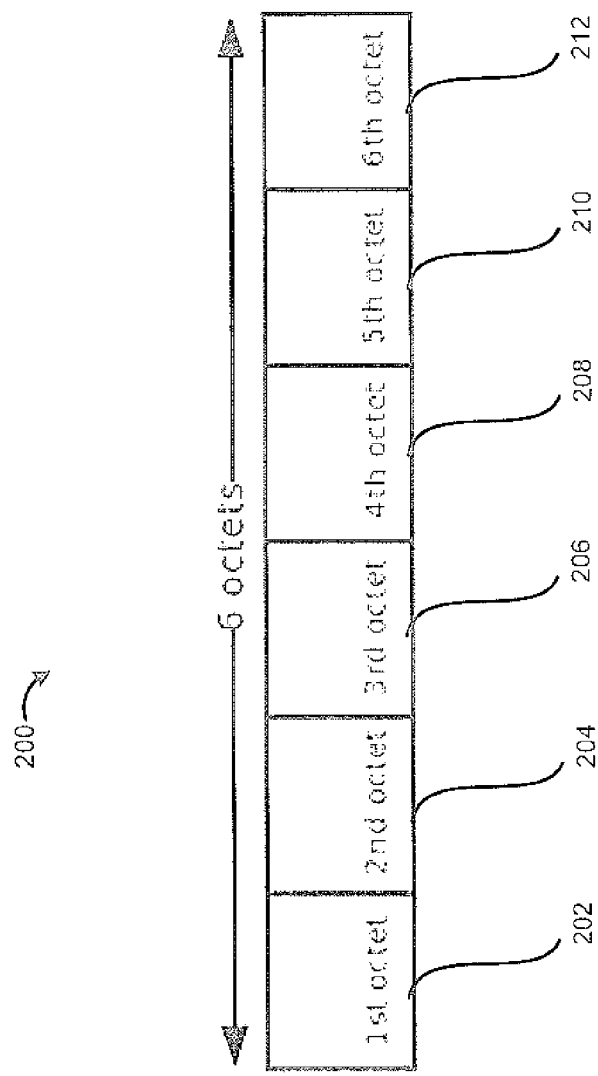
FIG. 2 illustrates an example of how devices may be uniquely identified on a network, in accordance with embodiments of the present invention.

FIG. 2 illustrates an example system 200 for an example device identifier, specifically a MAC address. A MAC address of a device is a unique identifier assigned to network interfaces for communications at the data link layer of a network segment. MAC addresses may be used as a network address for most IEEE 802 network technologies, including Ethernet and Wi-Fi. MAC addresses are most often assigned by the manufacturer of a network interface controller (NIC) and may be stored in hardware. For example, the MAC addresses may be stored in a NIC card's read-only memory or some other firmware mechanism. MAC addresses that are assigned by the manufacturer, typically encode the manufacturer's registered identification number, for example, a burned-in address (BIA), an Ethernet hardware address (EHA), hardware address or physical address. Unlike a programmed address, where a host device issues commands to the NIC to use an arbitrary address, the MAC address is uniquely assigned to the hardware device, as MAC addresses are permanently burned into hardware by hardware manufacturer.

A network node may have multiple NICs and each NIC must have a unique MAC address. Sophisticated network equipment such as a multilayer switch or router may require one or more permanently assigned MAC addresses. MAC addresses are formed according to the rules of one of three numbering name spaces managed by the Institute of Electrical and Electronics Engineers (IEEE): MAC-48, EUI-48, and EUI-64. A MAC address is a globally unique identifier assigned to network devices, and therefore it is often referred to as hardware or physical address. MAC addresses are 6-bytes (48-bits) in length, and are written in MM:MM:MM:SS:SS:SS format. A byte has eight bits, and in FIG. 2, each byte is referred to as an octet. The first 3-bytes, 202, 204, and 206, are an identification (ID) number of the manufacturer, which is assigned by an Internet standards entity. The second 3-bytes, 208, 210, and 212, are a serial number assigned by the manufacturer.

The first three octets (in transmission order), 202, 204, and 206, identify the organization that issued the identifier and are known as the Organizationally Unique Identifier (OUI). The remainder of the address, 208, 210, and 212, are assigned by the corresponding organization (three octets for MAC-48 and EUI-48 or five for EUI-64), using various unique combinations. According to embodiments of the present invention, the device recognition system implements an algorithm that analyses the remainder of the address (last three octets: 208, 210, 212) by training supervised machine learning ensembles to create a prediction/classification model. The supervised machine learning ensembles includes multiple decision trees that enable the prediction/classification model to predict specific device properties of much higher level of detail, like type, brand, family and model, with a much smaller set of device data from a limited number of devices on the network.

Figure 3:
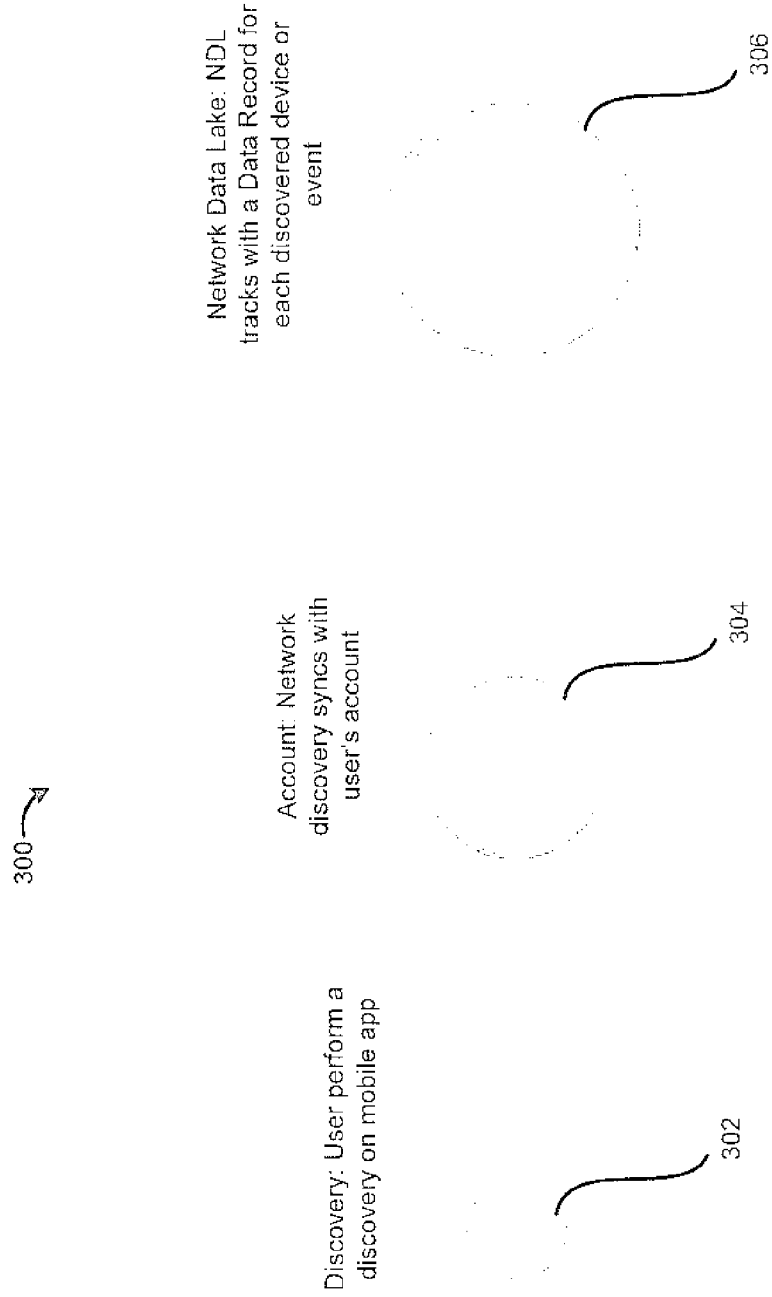
FIG. 3 illustrates an example overview flow diagram of a method of collecting device information, in accordance with an embodiment of the present invention.

FIG. 3 illustrates an example overview flow diagram of a method 300 of collecting device information, in accordance with an embodiment of the present invention. According to various embodiments of the present invention, data collection or discovery feeds data into a Network Data Lake (NDL), which may be used by the device recognition system or third party entity to predict user behavior and user devices on the network. Data collection at the discovery step 300 may be executed by software operating on a device such as a personal computer (PC) and mobile application available on Windows, OS X, Linux, armbian, Android, iOS, or any other suitable operating system. Discovery 302 may be executed as a network scanner software to performs network audits providing the list of devices connected to the network, and may be executed by the user performing a discovery on his or her mobile application on his or her mobile device, for example.

According to various embodiments, the device recognition system may provide an account service. At 304, a remote account service may provide synchronization of device discovery data from 302 with the user's account information (e.g., user's personal information used to set up the account). The automatic synchronization and storage of discovered networks from users at the discovery stage 302 allows the device recognition system to crowdsource network and device data from its user base. Moreover, at 304, collected network information may be stored on a cloud computing system or other external storage system such that the collected network information is not lost when a user changes or resets a personal device. The collected network information may be protected and encrypted according to various techniques.

According to some embodiments, the device recognition system may provide device recognition services to users without the account syncing in step 304. For example, users may transmit collected network data collected at step 302 directly to the device recognition system. In some embodiments, the device recognition system may include one or more cloud servers that collect and store the collected network data from its users as user-anonymous network information. In response, the device recognition system may analyze and provide results to show to requesting users detailed properties for each device discovered in the network.

At step 306, the device and network data collected and synced with account data may be stored on the cloud in a Network Data Lake (NDL). The NDL may track with a data record for each discovered device or event. The NDL may be implemented with architecture sufficient to store, manage, and queue large amounts of data.

According to various embodiments of the present invention, the device recognition system may implement an algorithm that accesses data from the NDL and performs parallel distributed processing (e.g., filtering, mappings, reductions, aggregations and machine learning jobs) to process the input data set and produce an output data set of device recognitions. The algorithm may be executed to perform as a data model to generate a larger output data set of predictive data based on a smaller input data set. Examples of data in the input data set include, but are not limited to: collected device records, including device MAC address (e.g., using the MAC address as a key and/or unique identifier), and audited network information of several protocols (e.g., DHCP, NetBIOS, Bonjour, UPnP, DNS, SNMP, HTTP, HTTP User Agent, Wi-Fi probes).

The output data set, according to various embodiments, may include device recognition fingerprints that are composed by: (1) specific unique entries for each single MAC address (i.e., identified known devices); and (2) prediction sets of MAC clusters sharing same device properties. For example, identified devices are mapped and linked to a device catalogue, providing specific properties, as examples:

Device type—e.g., Mobile, Laptop, Server, Smart Home Controller
Market brand—e.g., Apple, Samsung
Market family—e.g., iPhone, Galaxy
Market model—e.g., iPhone 7, Galaxy Note 8
Device storage—e.g., 64 GB, 128 GB
Device color—e.g., white, rose, gold, black The data model may be normalized to allow the device recognition algorithm to produce fingerprints that can be very specific (e.g., device market model) or also very general (e.g., device market brand).

Figure 4:
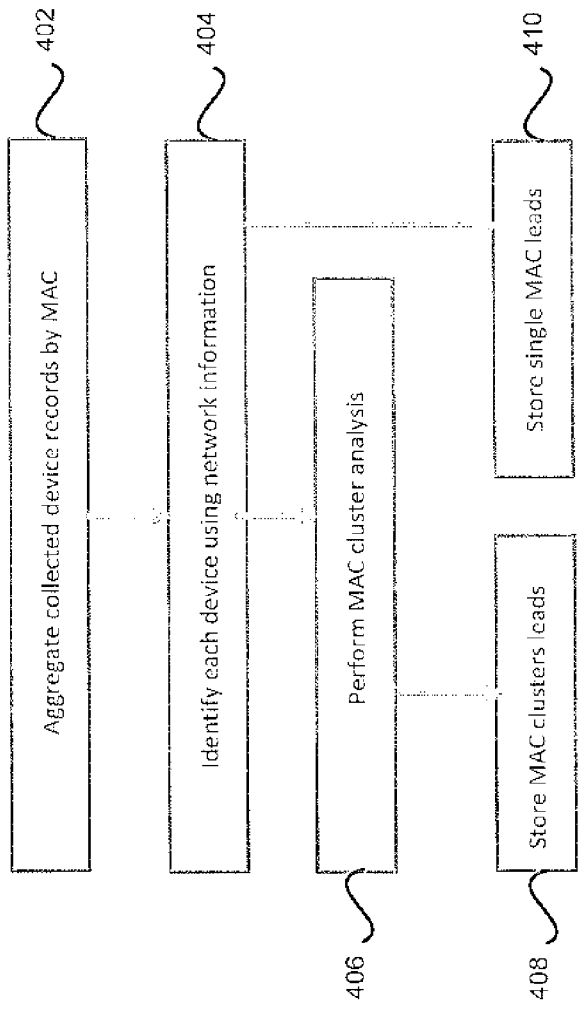
FIG. 4 illustrates an example flow diagram of a method of aggregating collected device information, in accordance with an embodiment of the present invention.

FIG. 4 illustrates an example flow diagram of a method of a device recognition learning algorithm according to various embodiments of the present invention. At 402, the device recognition algorithm may analyze NDL records to uniquely identify and aggregate the records by device. The collected device records may be aggregated, for example, by the MAC address as a key or a unique identifier.

At 404, each aggregated device record is then analyzed individually using network information. For example, from each aggregated device record, the device may be identified with specific per-protocol classification rules based on the specific properties in the device catalogue (e.g., device type, market band, market family, market model, device storage, device color, etc.). Identified devices may be stored as single MAC address record (e.g., a identified, known device and its corresponding MAC address) in a specific storage that may be used for lookup at 410. The MAC address records for each device may also be used as inputs into a MAC cluster analysis algorithm at step 406.

At 406, MAC cluster algorithm analysis is performed on all qualified identification records, grouping them by analyzing the remainder tail portion of the MAC address (which may be of variable length partitions of last three octets or bytes based on the organization; e.g., three octets for MAC-48 and EUI-48 or five for EUI-64). The MAC cluster analysis is performed by training supervised machine learning ensembles by finding co-occurrences of the same device properties in clusters of MAC addresses. Because devices of the same model are made in batches, a device identified to have a specific MAC address can be used as a reference device to determine the cluster of MAC addresses for other devices made in the same batch. For example, once the MAC address for a known, identified reference device is determined, then it is highly likely that the devices manufactured in the same batch will have MAC addresses within the same cluster, and the MAC cluster analysis algorithm can predict that devices with MAC addresses within that cluster have the same device specifications (e.g., same brand and model) as the identified reference device.

At 408, identified MAC clusters records (e.g., MAC address cluster for an identified type, make, model of device and its corresponding device specifications) may be stored in MAC cluster leads storage, that will be used for lookup. For example, once a MAC cluster has been identified as being iPhone 7's, then that MAC cluster and its associated device specifications can be stored at 408.

Figure 5:
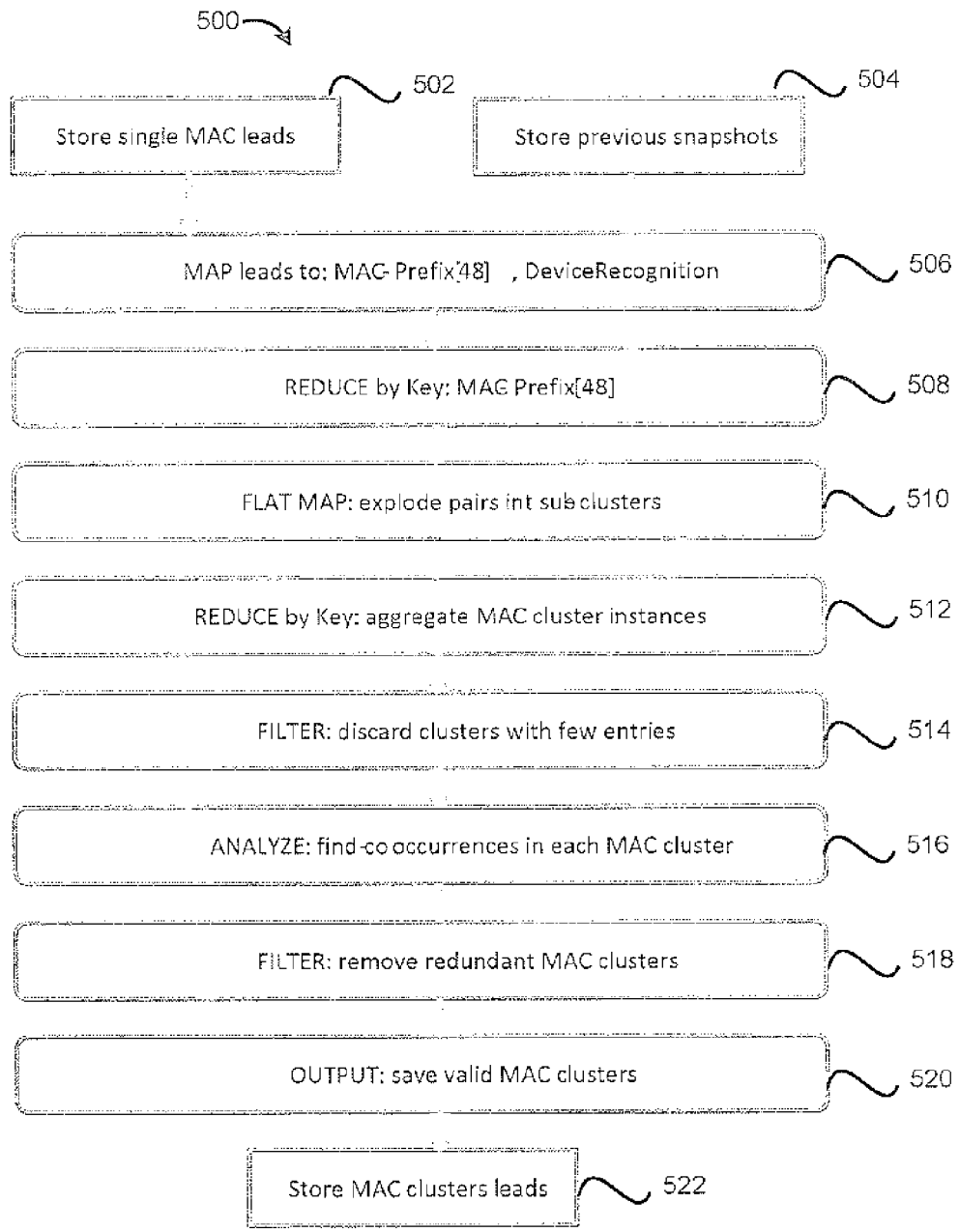
FIG. 5 illustrates an example flow diagram of a method of device information cluster analysis, in accordance with an embodiment of the present invention.

FIG. 5 illustrates an example flow diagram of a method of device information cluster analysis, in accordance with an embodiment of the present invention. Method 500 is an example of a device recognition learning/MAC clustering analysis according to an embodiment of the invention. Method 500 is an example of an algorithm that may be used in step 406 of FIG. 4. The MAC cluster algorithm 500 may analyze qualified MAC identification records, either single MAC leads (e.g., a MAC address corresponding to a singular identified device) at 502 (generated from step 404 of FIG. 4), or previously stored identified MAC cluster leads or previously stored snapshots (e.g., a MAC cluster corresponding to devices of a specific make and model) at 504.

At 506, the MAC cluster analysis maps the leads to MAC-prefixes as keys. As noted earlier, MAC addresses are composed of six bytes or six octets where the first 3 octets are globally assigned by a standard authority such as IEEE. The authority assigns the prefix to each organization and publishes it in a public list that is globally used as a 'manufacturer' attribute. A prefix of the first three octets gives a range of available MAC addresses of 2^24 (24 are the bits of the tail). Thus, the key may be set to a MAC-Prefix[x] that is a variable length prefix of the MAC address, where [x] is the prefix size in bits, compared to a full MAC address that is made up of 6 octets, 48 bits. As such, a valid prefix key is in the range 1-48 bits, but since the first 24 bits are assigned by IEEE to each specific vendor, the MAC cluster analysis uses, as the key, the portion of the MAC prefixes that are in the range of 24-48. In some embodiments, the MAC cluster analysis may use a smaller portion of the MAC prefix, for example bits in the range of 34-41. This is because bigger prefixes can introduce too much entropy or variance, while smaller prefixes result in a smaller subset of devices, therefore it may be unnecessary to analyze MAC prefixes with large bit ranges. For example, a 47 bit prefix includes the two 48 bit possible sub-partitions, and so on for any MAC cluster and related tailing partitions; they are progressive inclusive sets.

Additionally, in step 506, the cluster analysis method 500 may execute a device recognition analysis. According to some embodiment, the device recognition analysis may include accessing a data structure containing device identification fields, including, but not limited to:
Device type
Brand
Family
Model
Rank (a measure of quality of the lead, 0-100%)

In some embodiments, the MAC cluster algorithm may run the learning classifications on Hadoop/Spark to compute expansions, aggregations and reductions by means of DAG (Direct Acyclic Graphs).

At 508, according to some embodiments, the MAC cluster algorithm method 500 may reduce by key (e.g., MAC prefix), resulting in unique information for each input MAC address. Generally, step 508 may be necessary when merging previously stored snapshots.

At 510, the MAC cluster algorithm method 500 may flatten the map for each input pair matching a key to a device (e.g., MAC-Prefix[48] to a recognized/identified device), such that a number of output pairs are generated. Each output pair is generated for each different chosen prefix length, for example, by the key from MAC-Prefix[34] down to MAC-Prefix[41].

At 512, the output pairs may then be reduced and aggregated by key. For example, each MAC-Prefix[x] instance (e.g., each key) is aggregated so that the value becomes the list of all specific MAC addresses belonging to the cluster that correspond to a make and model of the devices manufactured in the same batch.

At 514, the results may then be filtered to eliminate MAC clusters with too few entries with respect to the cluster size, as a cluster size that is too small may indicate a lower confidence that the MAC cluster accurately identifies the devices manufactured in that batch. In some embodiments there may be a minimum threshold for the cluster size; for example, minimum entries=3+2*(clusterSize−12).

At 516, the MAC cluster analysis algorithm 500 may then analyze co-occurrences to validate MAC clusters with increased confidence in its accuracy. For example, each MAC-cluster instance may be processed by comparing all the device recognition entries contained within the cluster. In some embodiments, there may be a range of margin of tolerance for error or outliers. With the margin tolerance for outliers, the MAC cluster analysis algorithm 500 looks for co-occurring attribute set, such as device type, brand, family, model, at step 516.

In some embodiments, there may be a confidence score that is determined for the MAC cluster. For example, a confidence score may be calculated as a percentage or a function of the highest differing bit in single MAC leads compared to total cluster size. The confidence score may then used to rank the output device recognitions corresponding to the MAC cluster, and/or discard clusters whose confidence level is below a determined minimum threshold.

At 518, the results may be further filtered to remove redundant MAC clusters. For example, smaller validated clusters may be already included in larger validated clusters. As such, the smaller cluster may be removed as redundant, leaving the larger validated cluster as retaining the validated MAC cluster and its corresponding device recognition data (e.g., identified devices).

At 520, the MAC clustering analysis method 500 may output the stored validated MAC clusters by MAC prefix (e.g., key) as lookup tables. The lookup table may be stored as a device recognition query/lookup for utilization in a device recognition prediction model. The device recognition lookup and query may use the fingerprints stored by the Device Recognition Learning algorithm of FIG. 4, specifically the MAC clustering analysis method 500. For example, a MAC address may be used as key to query the single MAC leads, or in some embodiments, variable length partitions of MAC prefixes may be used as keys to query the MAC clusters. The matching results may be returned and sorted by rank or a confidence score.

At 522, the resulting MAC cluster leads may then be stored and iteratively used as inputs as previously stored snapshots in step 504.

Figure 6:
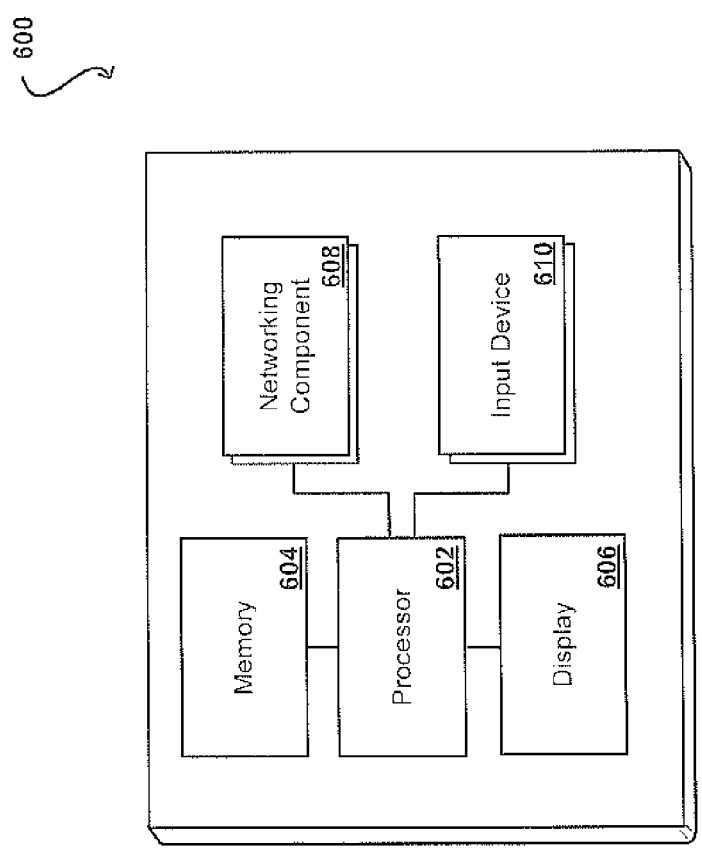
FIG. 6 illustrates a high level block diagram of a computer system, in accordance with an embodiment of the present invention.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art. It should be appreciated that the computer-implemented methods and systems as discussed herein have the ability to more quickly and more accurately predict/recognize devices within a network than currently known techniques, thereby decreasing computer processing power needed for such device prediction/recognition as well as decreasing the error rate and increasing a confidence score associated with such device prediction/recognition. Furthermore, it should therefore be appreciated that the methods and systems as disclosed herein surpass what is considered well-understood, routine, or conventional.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A device recognition system comprising:
   a data collection module configured to collect device data associated with a device on a network;
   an identification data module configured to determine an identifier for the device based at least in part on the device data; and a cluster analysis module configured to:
   obtain the least significant bits of a hardware address for the device;
   determine a key based on an analysis of the least significant bits of the hardware address of the device; and
   predict, using machine learning ensembles and the key, a set of device characteristics based at least in part on the identifier and the least significant bits of the hardware address, wherein the machine learning ensembles classify the device into a predicted group of devices having the set of device characteristics.

2. The device recognition system of claim 1, wherein the least significant bits of the hardware address include bits in the range of bits 24 through 48 of the hardware address.

3. The device recognition system of claim 1, wherein the least significant bits of the hardware address include bits in the range of bits 34 through 41 of the hardware address.

4. The device recognition system of claim 1, wherein the set of device characteristics include at least one of a device brand identifier and a device model identifier.

5. The device recognition system of claim 1, wherein the set of device characteristics include a manufacturing batch identifier.

6. The device recognition system of claim 1, wherein the machine learning ensembles utilize multiple decision trees to classify the device.

7. A method for device recognition, the method comprising:
   collecting device data associated with a device detected on a network;
   determining an identifier for the device based at least in part on the device data;
   obtaining the least significant bits of a hardware address for the device;
   determining a key based on an analysis of the least significant bits of the hardware address of the device; and
   predicting, using machine learning ensembles and the key, a set of device characteristics based at least in part on the identifier and the least significant bits of the hardware address, wherein the machine learning ensembles classify the device into a predicted group of devices having the set of device characteristics.

8. The method of claim 7, wherein the number of least significant bits is proportional to a size of the predicted group of devices having the set of device characteristics.

9. The method of claim 8, further comprising the steps of generating a confidence score as a function of the least significant bits of the hardware address and of the size of the predicted group of devices.

10. The method of claim 7, wherein the set of device characteristics include at least one of a device brand identifier and a device model identifier.

11. The method of claim 10, wherein the set of device characteristics includes a manufacturing batch identifier.

12. The method of claim 7, wherein the machine learning ensembles utilize multiple decision trees to classify the device.

13. The method of claim 7, further comprising the step of providing targeted content to the device based on the set of device characteristics, wherein the device characteristics include a brand of the device and a model of the device.

14. A system comprising:
   a processor; and
   a non-transitory computer-readable medium storing instructions executable by the processor to:
      collect a plurality of device data associated with a set of devices detected on a network;
      determine a plurality of keys based on an analysis of the least significant bits of a hardware address of each device;
      identify, based at least in part on the plurality of keys, device specifications corresponding to the set of devices;
      determine a cluster of devices among the set of devices based at least in part on the device specifications; and
      store identifiers corresponding to devices in the cluster of devices and the corresponding keys from the plurality of keys in a data structure, wherein each key identifies where the identifier corresponding to a respective device in the cluster of devices is stored in the data structure.

15. The system of claim 14, wherein the hardware address is a media access control (MAC) address of each device in the set of devices.

16. The system of claim 14, wherein a length of the corresponding key is proportional to a size of the cluster of devices.

17. The system of claim 14, wherein the cluster of devices is determined after removal of a redundant cluster of devices of insufficient cluster size.

18. The system of claim 17, wherein the removal of a redundant cluster of devices of insufficient cluster size is based on a predetermined threshold.

19. The system of claim 14, wherein the device specifications are identified by utilizing the plurality of keys in machine learning ensembles.

* * * * *